US012671545B2

(12) United States Patent

Liu et al.

(10) Patent No.: US 12,671,545 B2

(45) Date of Patent: Jun. 30, 2026

(54) RESOURCE CONFIGURATION METHOD, APPARATUS, DEVICE, AND READABLE STORAGE MEDIUM

(71) Applicant: VIVO MOBILE COMMUNICATION CO., LTD., Dongguan (CN)

(72) Inventors: Hao Liu, Dongguan (CN); Peng Sun, Dongguan (CN); Rakesh Tamrakar, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 459 days.

(21) Appl. No.: 18/138,034

(22) Filed: Apr. 21, 2023

(65) Prior Publication Data

US 2023/0261836 A1 Aug. 17, 2023

Related U.S. Application Data

(63) Continuation of application No. PCT/CN2021/124956, filed on Oct. 20, 2021.

(30) Foreign Application Priority Data

Oct. 23, 2020 (CN) .......................... 202011150414.4

(51) Int. Cl.
*H04L 5/00* (2006.01)
(52) U.S. Cl.
CPC .................................. *H04L 5/0051* (2013.01)
(58) Field of Classification Search
None
See application file for complete search history.

(56) References Cited

U.S. PATENT DOCUMENTS

| | | | | |
|---|---|---|---|---|
| 2019/0349066 A1* | 11/2019 | Yang | ...................... | H04B 7/0697 |
| 2021/0036746 A1* | 2/2021 | Liu | ...................... | H04B 7/0456 |
| 2022/0166484 A1* | 5/2022 | Go | ...................... | H04W 72/23 |
| 2023/0300826 A1* | 9/2023 | Zhou | ...................... | H04L 5/0051 |
| | | | | 370/329 |
| 2023/0344555 A1* | 10/2023 | Yuan | ...................... | H04W 72/23 |

FOREIGN PATENT DOCUMENTS

| | | |
|---|---|---|
| CN | 110536450 A | 12/2019 |
| CN | 111095998 A | 5/2020 |
| WO | 2019161539 A1 | 8/2019 |
| WO | 110351037 A1 | 10/2019 |
| WO | 2019192448 A1 | 10/2019 |
| WO | 2020155179 A1 | 8/2020 |

(Continued)

OTHER PUBLICATIONS

International Search Report issued in corresponding International Application No. PCT/CN2021/124956, mailed Dec. 29, 2021, 6 pages.

(Continued)

*Primary Examiner* — Diane L Lo

(74) *Attorney, Agent, or Firm* — IPX PLLC

(57) ABSTRACT

A resource configuration method, an apparatus, a device, and a readable storage medium are provided. The method includes: receiving DCI; and determining, based on higher layer level signaling or the DCI, that a PUSCH transmission scheduled by the DCI is associated with one or more SRS resources.

16 Claims, 4 Drawing Sheets

(56) References Cited

FOREIGN PATENT DOCUMENTS

| | | | |
|---|---|---|---|
| WO | 2020162716 A1 | 8/2020 |
| WO | 2020165413 A1 | 8/2020 |

OTHER PUBLICATIONS

First Office Action issued in related Chinese Application No. 202011150414.4, mailed Jan. 28, 2023, 5 pages.

Nokia et al., "Maintenance of Rel-16 URLLC PDCCH enhancements", 3GPP TSG RAN WG1 Meeting #100 R1-2000432, Feb. 2020, 28 pages.

Nokia, "Introduction of NR URLLC support", 3GPP TSG-RAN WG1 Meeting #99 R1-1913650, Dec. 2019, 55 pages.

Extended European Search Report issued in related European Application No. 21882049.6, mailed Mar. 14, 2024, 13 pages.

VIVO: "Discussion on SRS enhancement", 3GPP Draft; RI-2005368; Aug. 2020; 17 pages.

* cited by examiner

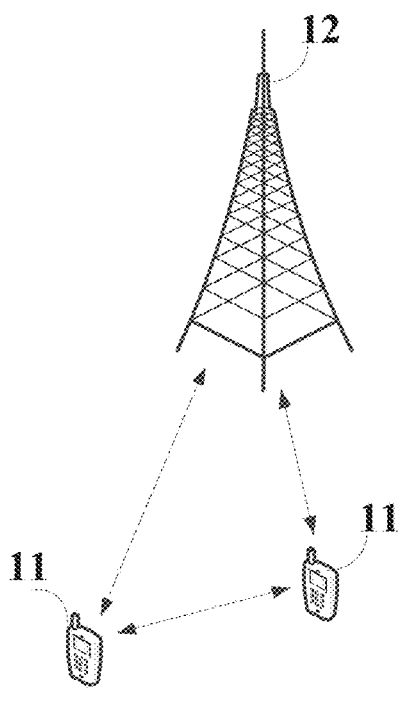

FIG. 1

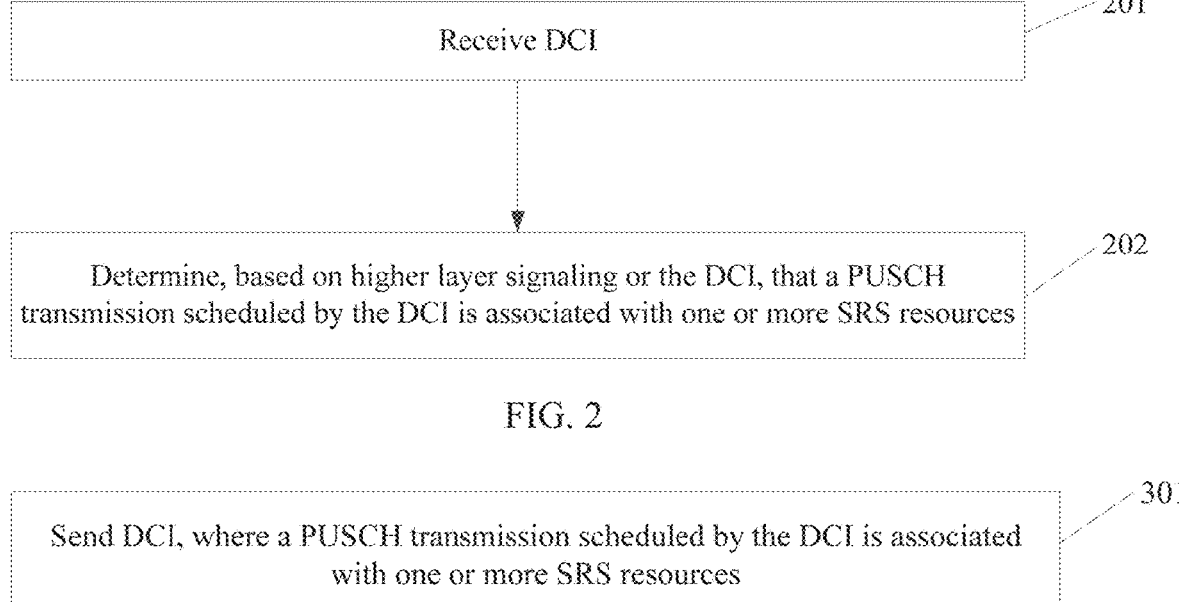

```
┌──────────────────────────────────────────────────────┐  ⟋ 201
│                    Receive DCI                          │
└──────────────────────────────────────────────────────┘
                          │
                          ▼
┌──────────────────────────────────────────────────────┐  ⟋ 202
│  Determine, based on higher layer signaling or the DCI, that a PUSCH │
│  transmission scheduled by the DCI is associated with one or more SRS resources │
└──────────────────────────────────────────────────────┘
```

FIG. 2

```
┌──────────────────────────────────────────────────────┐  ⟋ 301
│  Send DCI, where a PUSCH transmission scheduled by the DCI is associated │
│              with one or more SRS resources              │
└──────────────────────────────────────────────────────┘
```

RESOURCE CONFIGURATION METHOD, APPARATUS, DEVICE, AND READABLE STORAGE MEDIUM

CROSS-REFERENCE TO RELATED APPLICATIONS

This application is a continuation of International Application No. PCT/CN2021/124956, filed Oct. 20, 2021, which claims priority to Chinese Patent Application No. 202011150414.4, filed Oct. 23, 2020. The entire contents of each of the above-referenced applications are expressly incorporated herein by reference.

TECHNICAL FIELD

This application relates to the field of communications technologies, and in particular, to a resource configuration method, an apparatus, a device, and a readable storage medium.

BACKGROUND

In a communications system, when a Physical Uplink Shared Channel (PUSCH) configured by a higher layer operates in a codebook transmission mode, it is only supported that a PUSCH transmission scheduled by single downlink control information (single DCI) is associated with a Sounding Reference Signal (SRS) resource.

To support the PUSCH transmission at multiple sending and receiving points or panels (Multi-TRP/panel), that is, a PUSCH may switch transmission on different panels in a manner of time division, if single DCI continued to be used to schedule the PUSCH, in some cases, the PUSCH transmission is associated with a plurality of SRS resources, and different SRS resources are configured with different pieces of spatial relationship information. To improve reliability of the PSUCH transmission, the PUSCH can configure a repetition transmission mode, and different PUSCHs are repeatedly associated with different SRS resources. When a radio link corresponding to one of the SRS resources is poor, transmission reliability cannot be guaranteed.

SUMMARY

Embodiments of this application provide a resource configuration method, an apparatus, a device, and a readable storage medium, which can improve reliability of a PUSCH transmission.

According to a first aspect, a resource configuration method is provided and executed by a terminal, including:
receiving downlink control information DCI; and
determining, based on higher layer signaling or the DCI, that a physical uplink shared channel PUSCH transmission scheduled by the DCI is associated with one or more sounding reference signal SRS resources.

According to a second aspect, a resource configuration method is provided and executed by a terminal, including:
sending DCI, where a PUSCH transmission scheduled by the DCI is associated with one or more SRS resources.

According to a third aspect, a resource configuration apparatus is provided and applied to a terminal, including:
a first receiving module, configured to receive DCI; and
a first determining module, configured to determine, based on higher layer signaling or the DCI, that a PUSCH transmission scheduled by the DCI is associated with one or more SRS resources.

According to a fourth aspect, a resource configuration apparatus is provided and applied to a network side device, including:
a first sending module, configured to send DCI, where a PUSCH transmission scheduled by the DCI is associated with one or more SRS resources.

According to a fifth aspect, a terminal is provided, including a processor, a memory, and a program stored in the memory and capable of running on the processor, where when the program is executed by the processor, the steps of the method according to the first aspect are implemented.

According to a sixth aspect, a network side device is provided, including a processor, a memory, and a program stored in the memory and capable of running on the processor, where when the program is executed by the processor, the steps of the method according to the second aspect are implemented.

According to a seventh aspect, a readable storage medium is provided, where the readable storage medium stores a program or an instruction, and when the program or the instruction is executed by a processor, the steps of the method according to the first aspect or the second aspect are implemented.

According to an eighth aspect, a program product is provided, where the program product is stored in a non-volatile storage medium, and the program product is executed by at least one processor, to implement the steps of the processing method according to the first aspect or the second aspect.

According to a ninth aspect, a chip is provided, where the chip includes a processor and a communications interface, the communications interface is coupled to the processor, and the processor is configured to run a program or an instruction, to implement the processing method according to the first aspect or the second aspect.

In the embodiments of this application, the PUSCH transmission scheduled by the DCI may be associated with the one or more SRS resources to meet a requirement of the terminal for a dynamic PUSCH transmission. Further, when the PUSCH transmission is associated with the plurality of SRS resources, each SRS resource listens to different radio channels. The PUSCH transmission can be carried in a manner of repetition on the different radio channels to improve performance.

BRIEF DESCRIPTION OF DRAWINGS

FIG. 1 is a block diagram of a wireless communications system to which an embodiment of this application is applied;

FIG. 2 is a first flowchart of a resource configuration method according to an embodiment of this application;

FIG. 3 is a second flowchart of a resource configuration method according to an embodiment of this application;

DETAILED DESCRIPTION

Figure 4:
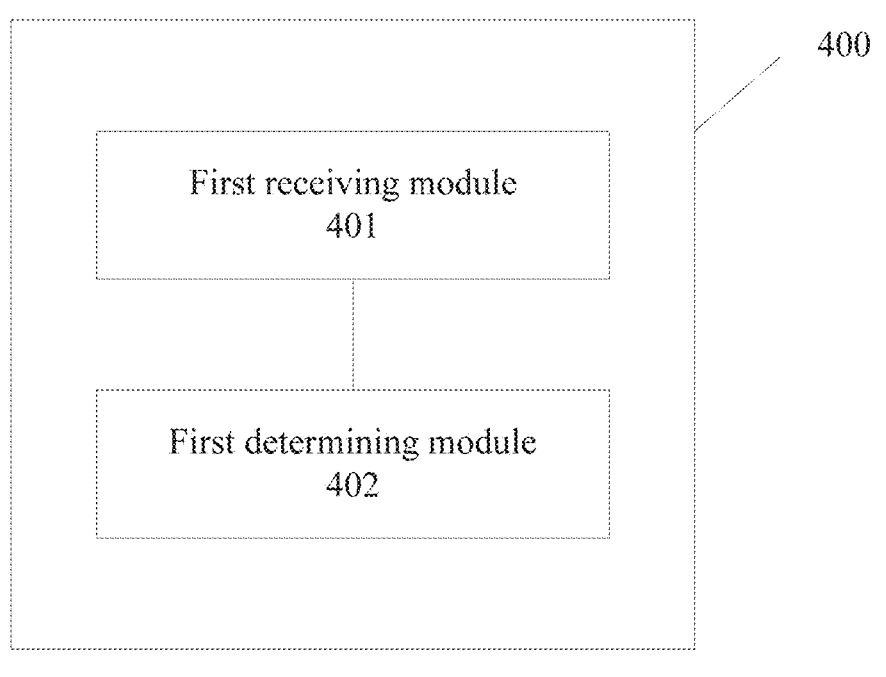
FIG. 4 is a first block diagram of a resource configuration apparatus according to an embodiment of this application.

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a designated order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, "and" in the specification and claims represents at least one of connected objects. Symbol "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The described technologies can be applied to both the systems and the radio technologies mentioned above as well as to other systems and radio technologies. However, a New Radio (NR) system is described in the following description for illustrative purposes, and the NR terminology is used in most of the following description, although these technologies can also be applied to applications other than the NR system application, such as the $6^{th}$ Generation (6G) communications system.

For ease of understanding of embodiments of this application, the following first describes technical terms:

(1) When a higher-layer parameter indicates that a Physical Uplink Shared Channel (PUSCH) transmission mode is codebook, a sounding reference signal resource indicator (SRI) field in a DCI format 0-1 or 0-2 is indicated by $\lceil \log_2(N_{SRS}) \rceil$ bits, where $N_{SRS}$ is a quantity of SRS resources in an SRS resource set that is configured in the higher-layer parameter and that is used for a codebook transmission. One unique SRS resource set can be configured by the higher layer for the codebook transmission.

(2) Phase Tracking Reference Signal (PTRS)-Demodulation Reference Signal (DMRS) association-2 bits:

Referring to Table 1 and Table 2, Table 1 indicates a relationship between a PTRS port and a DMRS port, and Table 2 indicates a PTRS-DMRS association for UL PTRS ports 0 and 1.

TABLE I

| Value | DMRS port |
|---|---|
| 0 | $1_{st}$ scheduled DMRS port |
| 1 | $2_{nd}$ scheduled DMRS port |

TABLE I-continued

| Value | DMRS port |
|---|---|
| 2 | $3_{rd}$ scheduled DMRS port |
| 3 | $4_{th}$ scheduled DMRS port |

TABLE 2

| Value of most significant bit (MSB) | DMRS port | Value of least significant bit (LSB) | DMRS port |
|---|---|---|---|
| 0 | $1_{st}$ DMRS port which shares PTRS port 0 | 0 | $1_{st}$ DMRS port which shares PTRS port 1 |
| 1 | $2_{nd}$ DMRS port which shares PTRS port 0 | 1 | $2_{nd}$ DMRS port which shares PTRS port 1 |

FIG. 1 is a block diagram of a wireless communications system to which an embodiment of this application can be applied. The wireless communications system includes a terminal 11 and a network side device 12. The terminal 11 may also be referred to as a terminal device or User Equipment (UE). The terminal 11 may be a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), pedestrian user equipment (PUE), or another terminal side device. The wearable device includes a wristband, earphones, glasses, and the like. The wearable device includes a wristband, a headset, glasses, and the like. It should be noted that a specific type of the terminal 11 is not limited in the embodiments of this application. The network side device 12 may be a base station or a core network. The base station may be referred to as a NodeB, an evolved NodeB (eNB), an access point, a Base Transceiver Station (BTS), a radio base station, a radio transceiver, a Basic Service Set (BSS), an Extended Service Set (ESS), a home NodeB, a home evolved NodeB, a WLAN access point, a Wi-Fi node, a Transmitting Receiving Point (TRP), or some other appropriate term in the art. As long as the same technical effect is achieved, the base station is not limited to a specific technical term. It should be noted that the base station in the NR system is taken only as an example in the embodiments of this application, but a specific type of the base station is not limited.

The following describes in detail the resource configuration method, the device, and the readable storage medium provided in the embodiments of this application through specific embodiments and application scenarios thereof with reference to the accompanying drawings.

Referring to FIG. 2, an embodiment of this application provides an SRS resource configuration method that is executed by a terminal. The method includes steps 201 and 202.

Step 201: Receive DCI.

The DCI may also be called single DCI (S-DCI).

Step 202: Based on higher layer signaling or the DCI, determine that a PUSCH transmission scheduled by the DCI is associated with one or more SRS resources.

In some embodiments, the PUSCH transmission includes M (M>=1) repetition occasions. Each nominal or actual PUSCH repetition occasion may be associated with one or more SRS resources based on a predefined rule.

For example, the plurality of SRS resources may be two SRS resources, or more than two SRS resources.

In some implementations, in step 202, based on an SRI field in the DCI, the one or more SRS resources that are associated with the PUSCH transmission scheduled by the DCI are determined.

There are one or more SRS resource sets that are used by the terminal for a codebook transmission. If there is one SRS resource set, the SRS resource set includes a plurality of SRS resources, and if there are a plurality of SRS resource sets, the plurality of SRS resource sets at least includes a first SRS resource set and a second SRS resource set.

In some embodiments, the SRI field indicates one or more of the following: that the PUSCH transmission is associated with one SRS resource in a specific SRS resource set, or that the PUSCH transmission is associated with a plurality of SRS resources in the specific SRS resource set.

If there is one SRS resource set, the specific SRS resource set is this SRS resource set. If the SRS resource set is provided in plurality, the specific SRS resource set is one of the plurality of SRS resource sets.

For example, the SRI field includes N bits, and N may be 2 or 1.

Using N=2 as an example, the SRI field indicates one or more of the following: (1) the PUSCH transmission is associated with a first SRS resource in the SRS resource set; (2) the PUSCH transmission is associated with a second SRS resource in the SRS resource set, and (3) the PUSCH transmission is associated with a plurality of SRS resources in the SRS resource set.

Using N=1 as an example, the SRI field indicates one or more of the following: (1) the PUSCH transmission is associated with one SRS resource in the SRS resource set, for example, an SRS resource with the smallest default SRS resource ID; and (2) the PUSCH transmission is associated with the plurality of SRS resources in the SRS resource set.

In some implementations, in step 202, first information (the higher layer signaling) is received; and the one or more SRS resources associated with the PUSCH transmission scheduled by the DCI are determined.

The first information indicates that the PUSCH transmission is associated with the one or more SRS resources, and a length of the SRI field in the DCI is 0 bit. That is, the SRI field in DCI does not exist. Further, the PUSCH transmission is, by default, associated with the plurality of SRS resources in the SRS resource set for the codebook transmission.

In some implementations, the method further includes:

receiving second information, where the second information is used to explicitly or implicitly indicate that the terminal starts a function that a PUSCH transmission is associated with the plurality of SRS resources.

In some implementations, the second information is the higher layer signaling. The higher layer signaling explicitly indicates that the terminal starts a function that the PUSCH transmission function is associated with the plurality of SRS resources.

In some implementations, in a case that the second information indicates a plurality of SRS resource sets for the codebook transmission, and the plurality of SRS resource sets at least include a first SRS resource set and a second SRS resource set, the second information is used to implicitly indicate that the terminal starts a function that the PUSCH transmission is associated with the plurality of SRS resources.

The second SRS resource set includes a plurality of SRS resources, and the second SRS resource set is used to indicate that the PUSCH transmission is associated with the plurality of SRS resources.

In some embodiments, the length of the SRI field may be 2 bits or 1 bit.

The SRI field includes first indication information and second indication information. The first indication information indicates a specific SRS resource in the first SRS resource set associated with the PUSCH transmission, or indicates whether the PUSCH transmission is associated with the specific SRS resource in the first SRS resource set.

The second indication information indicates a specific SRS resource in the second SRS resource set associated with the PUSCH transmission, or indicates whether the PUSCH transmission is associated with the specific SRS resource in the second SRS resource set.

Example 1: The first SRS resource set is configured with two SRS resources. The first indication information indicates that the PUSCH transmission is associated with one of the two SRS resources configured in the first SRS resource set.

The second SRS resource set is configured with two SRS resources. The second indication information indicates that the PUSCH transmission is associated with one of the two SRS resources configured in the second SRS resource set.

Example 2: The first SRS resource set is configured with one SRS resource. The first indication information indicates whether the PUSCH transmission is associated with the SRS resource configured in the first SRS resource set. The second SRS resource set is configured with one SRS resource. The second indication information indicates whether the PUSCH transmission is associated with the SRS resource configured in the second SRS resource set. In example 2, the first indication information and the second indication information cannot be both configured as "No".

In an embodiment of this application, the SRI field includes third indication information and fourth indication information.

The third indication information indicates the first SRS resource set or the second SRS resource set.

When the third indication information indicates the first SRS resource set, the fourth indication information indicates that the PUSCH transmission is associated with a first SRS resource or a second SRS resource in the first SRS resource set. In some embodiments, when the third indication information indicates the second SRS resource set, the third indication information implicitly indicates that the PUSCH transmission is associated with a plurality of SRS resources (such as all SRS resources) in the second SRS resource set, and the terminal does not parse the fourth indication information.

For example, the length of SRI field is 2 bits, the third indication information is 1 bit, and the fourth indication information is 1 bit.

In an embodiment of this application, the first SRS resource set includes one SRS resource, and the second SRS resource set includes a plurality of SRS resources.

The SRI field indicates that the PUSCH transmission is associated with the SRS resource in the first SRS resource set. In some embodiments, the SRI field indicates that the PUSCH transmission is associated with the plurality of SRS resources in the second SRS resource set. For example, the length of the SRI field is 1 bit.

In some embodiments, the first SRS resource and the second SRS resource may be determined based on an ascending order of SRS resource IDs. In some embodiments, the first SRS resource and the second SRS resource may be determined based on a descending order of the SRS resource IDs.

In some embodiments, the first SRS resource set and the second SRS resource set may be determined based on an ascending order of SRS resource set IDs. In some embodiments, the first SRS resource set and the second SRS resource set may be determined based on a descending order of SRS resource set IDs.

In an embodiment of this application, the method further includes:

determining, based on a PTRS DMRS association field of the DCI, an association relationship between a PTRS port and a DMRS port associated with different SRS resources.

A function of the terminal that a PUSCH transmission is associated with a plurality of SRS resources is enabled, and the PTRS DMRS association field indicates the association relationship between the PTRS port and the DMRS port.

For example, the higher layer signaling indicates that a function of associating the PUSCH transmission with the plurality of SRS resources is enabled.

It is described by using solution 1 and solution 2 below.

Solution 1: The PTRS DMRS association field is provided in plurality (for example, two). The plurality of PTRS DMRS association fields at least include: a first PTRS DMRS association field and a second PTRS DMRS association field. There are the following cases 1 and case 2.

Case 1: An SRI field in the DCI indicates that the PUSCH transmission is associated with one SRS resource.

One PTRS DMRS association field indicates the association relationship between the PTRS port and the DMRS port, and the terminal ignores indication of another PTRS DMRS association field.

Case 2: The SRI field in the DCI indicates that the PUSCH transmission is associated with the plurality of SRS resources (such as two SRS resources). The plurality of SRS resources at least include the first SRS resource and the second SRS resource.

The first PTRS DMRS association field indicates the association relationship between the PTRS port and the DMRS port, and the PTRS port and the DMRS port are associated with the first SRS resource.

The second PTRS DMRS association field indicates the association relationship between the PTRS port and the DMRS port, and the PTRS port and the DMRS port are associated with the second SRS resource.

In an embodiment of this application, if the terminal learns that the PUSCH transmission is associated with the plurality of SRS resources based on the SRI field of the DCI, the following (a) and (b) are included.

(a) If the maximum transmission rank of the terminal is limited to 2, the PTRS-DMRS association field is represented by 2 bits. There are two possible representation manners.

Manner 1: The PTRS DMRS association field includes fifth indication information (for example, 1 bit) and sixth indication information (for example, 1 bit). The fifth indication information indicates an association relationship between a port of a first PTRS resource and a scheduled DMRS port, and the scheduled DMRS port is sent on a PUSCH occasion associated with a first SRS resource.

The sixth indication information indicates an association relationship between a port of a second PTRS resource and the scheduled DMRS port, and the scheduled DMRS port is sent on a PUSCH occasion associated with a second SRS resource.

Manner 2: The PTRS DMRS association field includes seventh indication information. A value of the seventh indication information is used to indicate an association relationship between a port of a first PTRS resource and a scheduled DMRS port, and an association relationship between a port of a second PTRS resource and the scheduled DMRS port.

For example, four cases are indicated by 2 bits. Each case includes an association relationship between two PTRS resources and a DMRS port, referring to Table 4.

(b) If the maximum transmission rank of the terminal is limited to 4, the PTRS-DMRS association field is represented by 4 bits or 2 bits.

When a length of the PTRS DMRS association field is 4 bits, there are two possible representation manners:

Manner 1: The PTRS DMRS association field includes eighth indication information, ninth indication information, tenth indication information, and eleventh indication information. The eighth and the ninth indication information indicate a port of a first PTRS resource and a scheduled DMRS port. The scheduled DMRS port is sent on a PUSCH occasion associated with a first SRS resource.

The tenth indication information and eleventh indication information indicate an association relationship between a port of a second PTRS resource and the scheduled DMRS port, and the scheduled DMRS port is sent on a PUSCH occasion associated with a second SRS resource.

For example, the first two bits in the PTRS DMRS association field are used to indicate which scheduled DMRS port is associated with the port of the first PTRS resource. The DMRS port is sent on a PUSCH occasion associated with the first SRS resource. The last two bits in the PTRS DMRS association field are used to indicate which scheduled DMRS port is associated with the port of the second PTRS resource. The DMRS port is sent on the PUSCH occasion associated with the second SRS resource.

Manner 2: The PTRS DMRS association field includes twelfth indication information, where a value of the twelfth indication information is used to indicate that a port of a first PTRS resource is associated with a plurality of scheduled DMRS ports, and that a port of a second PTRS resource is associated with the plurality of scheduled DMRS ports.

For example, the 4 bits of the PTRS DMRS association field indicate 16 cases, and each case includes an association relationship between the two PTRS resources and the DMRS port, referring to Table 6.

In an embodiment of this application, each SRS resource is associated with a DMRS port group, and the DMRS port group includes at least two DMRS ports.

For example, when the PTRS DMRS association field is 2 bits, the PTRS DMRS association field includes thirteenth indication information and fourteenth indication information. The thirteenth indication information is used to indicate an association relationship between a port of the first PTRS resource and a DMRS port group, and the fourteenth indication information is used to indicate an association relationship between a port of the second PTRS resource and a DMRS port group.

Further, the at least two DMRS ports in the DMRS port group are determined by using the following:

the first two DMRS ports or the last two DMRS ports of all DMRS ports that are scheduled by the DCI;

or any two of all scheduled DMRS ports that are on each SRS resource and that are notified by the high layer signaling.

That is, each PTRS resource is associated with one group of DMRS ports, and a quantity of DMRS ports in each group is fixed to be 2, and determined based on a given selection rule. The selection rule can directly specify the first two or the last two of all scheduled DMRS ports, or notifies a value of the DMRS port in the group by using the higher layer signaling.

Solution 2: There is one PTRS DMRS association field. The PTRS DMRS association field includes fifteenth indication information, and the fifteenth indication information indicates an association relationship between ports of a plurality of PTRS resources and a DMRS port. The ports of the plurality of PTRS resources at least include a port of a first PTRS resource and a port of a second PTRS resource. The port of the first PTRS resource is associated with a first SRS resource, and the port of the second PTRS resource is associated with a second SRS resource.

If the terminal learns that the PUSCH transmission is associated with one SRS resource based on the SRI field of the DCI, the terminal obtains the association relationship between the PTRS port and the DMRS port based on N bit indication of the PTRS DMRS association field. If N bit indication information is greater than 2 bits, the terminal only interprets 2-bit information therein (for example, 2 bits of the lowest bit or the highest bit), and does not interpret other bit information.

In some embodiments, the configuration of the port of the first PTRS resource and the port of the second PTRS resource includes that: if the maximum quantity of ports of the PTRS resource of the terminal is N, the maximum quantity of ports of the first PTRS resource and the second PTRS resource is N, where N is equal to 1 or 2. In some embodiments, if the maximum quantity of PTRS resources of the terminal is N, a PTRS resource of a PTRS port 0 is the first PTRS resource, and a PTRS resource of a PTRS port 1 is the second PTRS resource, where N equals to 2.

In some embodiments, the maximum quantity of ports of the PTRS resource of the terminal is indicated by the high layer signaling, or determined based on coherent characteristics of a received transmitted precoding matrix indicator (TPMI) in the DCI.

For example, if an indication TPMI codebook is only a full coherent codebook set, a quantity of the PTRS ports is 1. If the indication TPMI codebook is a partial coherent or non-coherent codebook set, the quantity of the PTRS ports is 2.

In an embodiment of this application, the DCI indicates that the PUSCH transmission is associated with a plurality of SRS resources, and the PUSCH transmission includes M PUSCH repetition occasion, where M is greater than or equal to 1.

In an embodiment of this application, the plurality of SRS resources include a first SRS resource and a second SRS resource.

If M=1, and the PUSCH transmission is configured with intra-slot frequency hopping, a first frequency hopping resource of the PUSCH repetition occasion is associated with the first SRS resource, and a second frequency hopping resource of the PUSCH repetition occasion is associated with the second SRS resource.

If M>1, and the PUSCH transmission is configured with the intra-slot frequency hopping, two frequency hopping resources of each PUSCH repetition occasion are respectively associated with the first SRS resource and the second SRS resource.

In an embodiment of this application, that two frequency hopping resources of each PUSCH repetition occasion are respectively associated with the first SRS resource and the second SRS resource includes:

that a first frequency hopping resource of a PUSCH repetition occasion of an odd-numbered index is associated with the first SRS resource, and a second frequency hopping resource of the PUSCH repetition occasion of the odd-numbered index is associated with the second SRS resource; and that a first frequency hopping resource of a PUSCH repetition occasion of an even-numbered index is associated with the second SRS resource, and a second frequency hopping resource of the PUSCH repetition occasion of the even-numbered index is associated with the first SRS resource;

or that a first frequency hopping resource of a PUSCH repetition occasion of an odd-numbered slot is associated with the first SRS resource, and a second frequency hopping resource of a PUSCH repetition occasion of the odd-numbered slot is associated with the second SRS resource; and that a first frequency hopping resource of a PUSCH repetition occasion of an even-numbered slot is associated with the second SRS resource, and a second frequency hopping resource of the PUSCH repetition occasion of the even-numbered slot is associated with the first SRS resource;

or that a first frequency hopping resource of a PUSCH repetition occasion of an even-numbered index is associated with the first SRS resource, and a second frequency hopping resource of the PUSCH repetition occasion of the even-numbered index is associated with the second SRS resource; and that a first frequency hopping resource of a PUSCH repetition occasion of an odd-numbered index is associated with the second SRS resource, and a second frequency hopping resource of the PUSCH repetition occasion of the odd-numbered index is associated with the first SRS resource;

or that a first frequency hopping resource of a PUSCH repetition occasion of an even-numbered slot is associated with the first SRS resource, and a second frequency hopping resource of the PUSCH repetition occasion of the even-numbered slot is associated with the second SRS resource; and that a first frequency hopping resource of a PUSCH repetition of an odd-numbered slot is associated with the second SRS resource, and a second frequency hopping resource of the PUSCH repetition occasion of the odd-numbered slot is associated with the first SRS resource.

In an embodiment of this application, the PUSCH transmission is associated with the plurality of SRS resources in the following manners:

that a starting number of the first SRS resource in the plurality of SRS resources is associated with the first transmission occasion of the PUSCH transmission;

or that the starting number of the first SRS resource in the plurality of SRS resources is associated with the first slot in each radio frame.

In the embodiments of this application, the PUSCH transmission scheduled by the DCI may be associated with the one or more SRS resources to meet a requirement of the terminal for a dynamic PUSCH transmission. Further, when the PUSCH transmission is associated with the plurality of SRS resources, each SRS resource listens to different radio channels. The PUSCH transmission can be carried in a manner of repetition on the different radio channels to improve performance.

Referring to FIG. 3, an embodiment of this application provides a resource configuration method, executed by a network side device, including:

Step 301: Send DCI, where a PUSCH transmission scheduled by the DCI is associated with one or more SRS resources.

In an embodiment of this application, an SRI field in the DCI indicates that the PUSCH transmission is associated with one or more SRS resources.

In an embodiment of this application, the method further includes sending first information, where the first information indicates that the PUSCH transmission is associated with the one or more SRS resources, and a length of the SRI field in the DCI is 0 bit.

In an embodiment of this application, a PTRS DMRS association field of the DCI indicates an association relationship between a PTRS port and a DMRS port associated with different SRS resources.

It can be understood that a content of the method embodiment of the network side device is the same as that of the method embodiment of the terminal, which can refer to the previous description. Details are not repeated herein.

In the embodiments of this application, the PUSCH transmission scheduled by the DCI may be associated with the one or more SRS resources to meet a requirement of the terminal for a dynamic PUSCH transmission. Further, when the PUSCH transmission is associated with the plurality of SRS resources, each SRS resource listens to different radio channels. The PUSCH transmission can be carried in a manner of repetition on the different radio channels to improve performance.

The following description is in combination with Embodiment 1 and Embodiment 2 of this application.

Embodiment 1 of this application:

Currently, the PUSCH is configured with a codebook transmission mode. Only one SRS resource set for a codebook function is configured in the higher layer, and the PUSCH can only be associated with one SRS resource in the SRS resource set. To enhance reliability of the PUSCH transmission, the PUSCH can be associated to two SRS resources. Each SRS resource listens to different radio channels. The PUSCH transmission can be carried in a manner of repetition on the different radio channels to improve performance.

In an embodiment, the higher layer is only configured with one SRS resource set for the codebook function, but the higher layer explicitly indicates UE by using another parameter, and that a function that "the PUSCH transmission is associated with two SRS resources" is enabled. In this case, the SRS resource set must be configured with the two SRS resources, and dynamically indicate whether the PUSCH is associated with the SRS resource or the two SRS resources by using the SRI field in the DCI, so as to dynamically match a change of the radio channel. For example, when a base station detects that quality of the radio channel listened by one of the SRS resources is poor, an SRI field of the next piece of the DCI can indicate that the other SRS resource is used for the PUSCH transmission.

In another embodiment, if the higher layer is not configured with a parameter to indicate that UE PUSCH is associated with a transmission of the two SRS resources, or to implicitly indicates that a function that "the PUSCH transmission is associated with the two SRS resources" is enabled based on a quantity of SRS resource sets configured in RRC for the codebook function. For example, when there is one SRS resource set, it is an existing technology. When there are two SRS resource sets, the UE considers that the PUSCH can be associated to a transmission of the two SRS resources.

Embodiment 2 of this application:

One PTRS-DMRS association field is configured, whose bit information jointly indicates an association relationship between two PTRS resources and a corresponding DMRS port, where each PTRS resource is associated with a plurality of SRS resources. If the UE learns that the PUSCH transmission is associated with the two SRS resources based on the SRI field of the DCI, and the maximum quantity of ports for each PTRS resource is configured as 1 by the higher layer signaling.

(1) If the maximum transmission rank of the UE is limited to 2, the PTRS-DMRS association field is represented by 2 bits. There are two possible representation manners.

Manner 1: 1 bit is used to indicate whether one unique port of the first PTRS is associated with the first or the second scheduled DMRS port. The DMRS is sent on the PUSCH occasion associated with the first SRS resource. The other 1 bit is used to indicate whether one unique port of the second PTRS is associated with the first or the second scheduled DMRS port. The DMRS is sent on the PUSCH occasion associated with the second SRS resource, as shown in Table 3.

TABLE 3

| Value of MSB | DMRS port associated with first SRS resource | Value of LSB | DMRS port associated with second SRS resource |
|---|---|---|---|
| 0 | $1_{st}$ DMRS port | 0 | $1_{st}$ DMRS port |
| 1 | $2_{nd}$ DMRS port | 1 | $2_{nd}$ DMRS port |

Manner 2: 2 bits indicate four cases. Each case includes an association relationship between ports of the two PTRS resources and a DMRS port, as shown in Table 4.

TABLE 4

| Value | DMRS port is associated with the first SRS resource | DMRS port is associated with the second SRS resource |
|---|---|---|
| 0 | $1_{st}$ scheduled DMRS port | $1_{st}$ scheduled DMRS port |
| 1 | $1_{st}$ scheduled DMRS port | $2_{nd}$ scheduled DMRS port |
| 2 | $2_{nd}$ scheduled DMRS port | $1_{st}$ scheduled DMRS port |
| 3 | $2_{nd}$ scheduled DMRS port | $2_{nd}$ scheduled DMRS port |

(2) If the maximum transmission rank of the UE is limited to 4, when the PTRS-DMRS association field is represented by 4 bits, there are two possible representation manners.

Manner 1: The first two bits are used to indicate which DMRS port is associated with the unique port of the first PTRS. The DMRS is sent on the PUSCH occasion associated with the first SRS resource. The last two bits are used to indicate which DMRS port is associated with the unique port of the second PTRS. The DMRS is sent on the PUSCH occasion associated with the first SRS resource, as shown in Table 5.

TABLE 5

| Value of MSB | DMRS port is associated with the first SRS resource | Value of LSB | DMRS port is associated with the second SRS resource |
|---|---|---|---|
| 0 | $1_{st}$ DMRS port | 0 | $1_{st}$ DMRS port |
| 1 | $2_{nd}$ DMRS port | 1 | $2_{nd}$ DMRS port |
| 2 | $3_{rd}$ DMRS port | 2 | $3_{rd}$ DMRS port |
| 3 | $4_{th}$ DMRS port | 3 | $4_{th}$ DMRS port |

Manner 2: 4 bits indicate 16 cases. Each case includes an association relationship between ports of the two PTRS resources and a DMRS port, as shown in Table 6.

TABLE 6

| Value | DMRS port is associated with the first SRS resource | DMRS port is associated with the second SRS resource |
|---|---|---|
| 0 | $1_{st}$ scheduled DMRS port | $1_{st}$ scheduled DMRS port |
| 1 | $1_{st}$ scheduled DMRS port | $2_{nd}$ scheduled DMRS port |
| 2 | $1_{st}$ scheduled DMRS port | $3_{rd}$ scheduled DMRS port |
| 3 | $1_{st}$ scheduled DMRS port | $4_{th}$ scheduled DMRS port |
| 5 | $2_{nd}$ scheduled DMRS port | $1_{st}$ scheduled DMRS port |
| 6 | $2_{nd}$ scheduled DMRS port | $2_{nd}$ scheduled DMRS port |
| 7 | $2_{nd}$ scheduled DMRS port | $3_{rd}$ scheduled DMRS port |
| 8 | $2_{nd}$ scheduled DMRS port | $4_{th}$ scheduled DMRS port |
| . . . | . . . | . . . |
| 12 | $4_{th}$ scheduled DMRS port | $1_{st}$ scheduled DMRS port |
| 13 | $4_{th}$ scheduled DMRS port | $2_{nd}$ scheduled DMRS port |
| 14 | $4_{th}$ scheduled DMRS port | $3_{rd}$ scheduled DMRS port |
| 15 | $4_{th}$ scheduled DMRS port | $4_{th}$ scheduled DMRS port |

Referring to FIG. 4, an embodiment of this application provides a resource configuration apparatus, applied to a terminal. The apparatus 400 includes:

a first receiving module 401, configured to receive DCI; and a first determining module 402, configured to determine, based on higher layer signaling or the DCI, one or more SRS resources that are associated with a PUSCH transmission scheduled by the DCI.

In an embodiment of this application, the first determining module is further configured to determine, based on an SRI field in the DCI, the one or more SRS resources that are associated with the PUSCH transmission scheduled by the DCI. There are one or more SRS resource sets that are used by the terminal for the codebook transmission. If there is one SRS resource set, the SRS resource set includes a plurality of SRS resources. If there are a plurality of SRS resource sets, the plurality of SRS resource sets at least includes a first SRS resource set and a second SRS resource set.

In an embodiment of this application, the SRI field indicates one or more of the following:

that the PUSCH transmission is associated with one SRS resource in a specific SRS resource set; and that the PUSCH transmission is associated with a plurality of SRS resources in the specific SRS resource set.

In an embodiment of this application, the first determining module is further configured to: receive first information; and determine, based on the first information, one or more SRS resources associated with a PUSCH transmission scheduled by the DCI.

The first information indicates that the PUSCH transmission is associated with the one or more SRS resources, and a length of the SRI field in the DCI is 0 bit.

In an embodiment of this application, the apparatus further includes:

a second determining module, configured to determine, based on a PTRS DMRS association field of the DCI, an association relationship between a PTRS port and a DMRS port associated with different SRS resources.

A function of the terminal that a PUSCH transmission is associated with a plurality of SRS resources is enabled, and the PTRS DMRS association field indicates the association relationship between the PTRS port and the DMRS port.

In an embodiment of this application, the PUSCH transmission is associated with the plurality of SRS resources in the following manners:

(1) Repetition transmission occasions of different PUSCH transmissions are associated with the plurality of SRS resources.

For example, the first SRS resource may be associated with PUSCH repetition of an odd-numbered index, and the second SRS resource may be associated with PUSCH repetition of even-numbered index.

(2) Transmission frequency hopping patterns of different PUSCH transmissions are associated with the plurality of SRS resources.

(3) Slots of indexes of different PUSCH transmissions are associated with the plurality of SRS resources.

For example, the first SRS resource may be associated with a slot of an odd-numbered index, and the second SRS resource may be associated with a slot of an even-numbered index.

The apparatus provided in this embodiment of this application can implement the processes implemented in the method embodiments in FIG. 2, with the same technical effect achieved. To avoid repetition, details are not described herein again.

Figure 5:
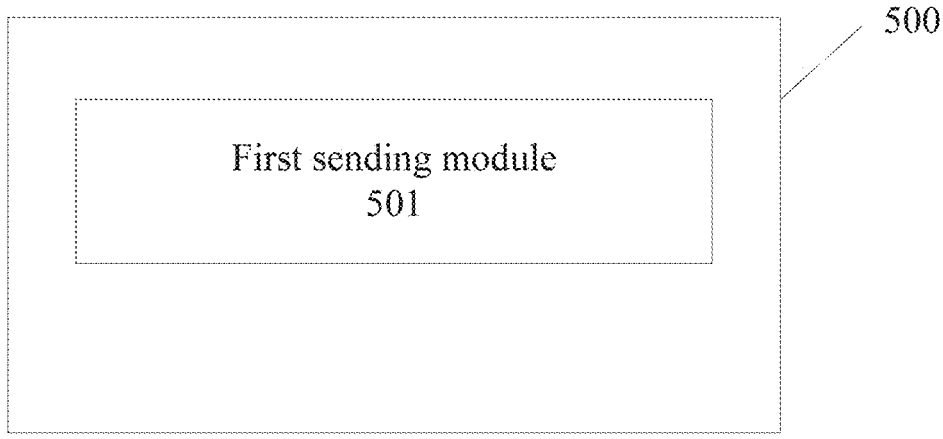
FIG. 5 is a second block diagram of a resource configuration apparatus according to an embodiment of this application.

Referring to FIG. 5, an embodiment of this application provides a resource configuration apparatus, applied to a network side device. The apparatus 500 includes:

a first sending module 501, configured to send DCI, where a PUSCH transmission scheduled by the DCI is associated with one or more SRS resources.

In an embodiment of this application, an SRI field in the DCI indicates that the PUSCH transmission is associated with the one or more SRS resources.

In an embodiment of this application, the apparatus further includes:

a second sending module, configured to send the first information indicates that the PUSCH transmission is associated with the one or more SRS resources, and a length of the SRI field in the DCI is 0 bit.

In an embodiment of this application, a PTRS DMRS association field of the DCI indicates an association relationship between a PTRS port and a DMRS port associated with different SRS resources.

The apparatus provided in this embodiment of this application can implement the processes implemented in the method embodiments in FIG. 3, with the same technical effect achieved. To avoid repetition, details are not described herein again.

Figure 6:
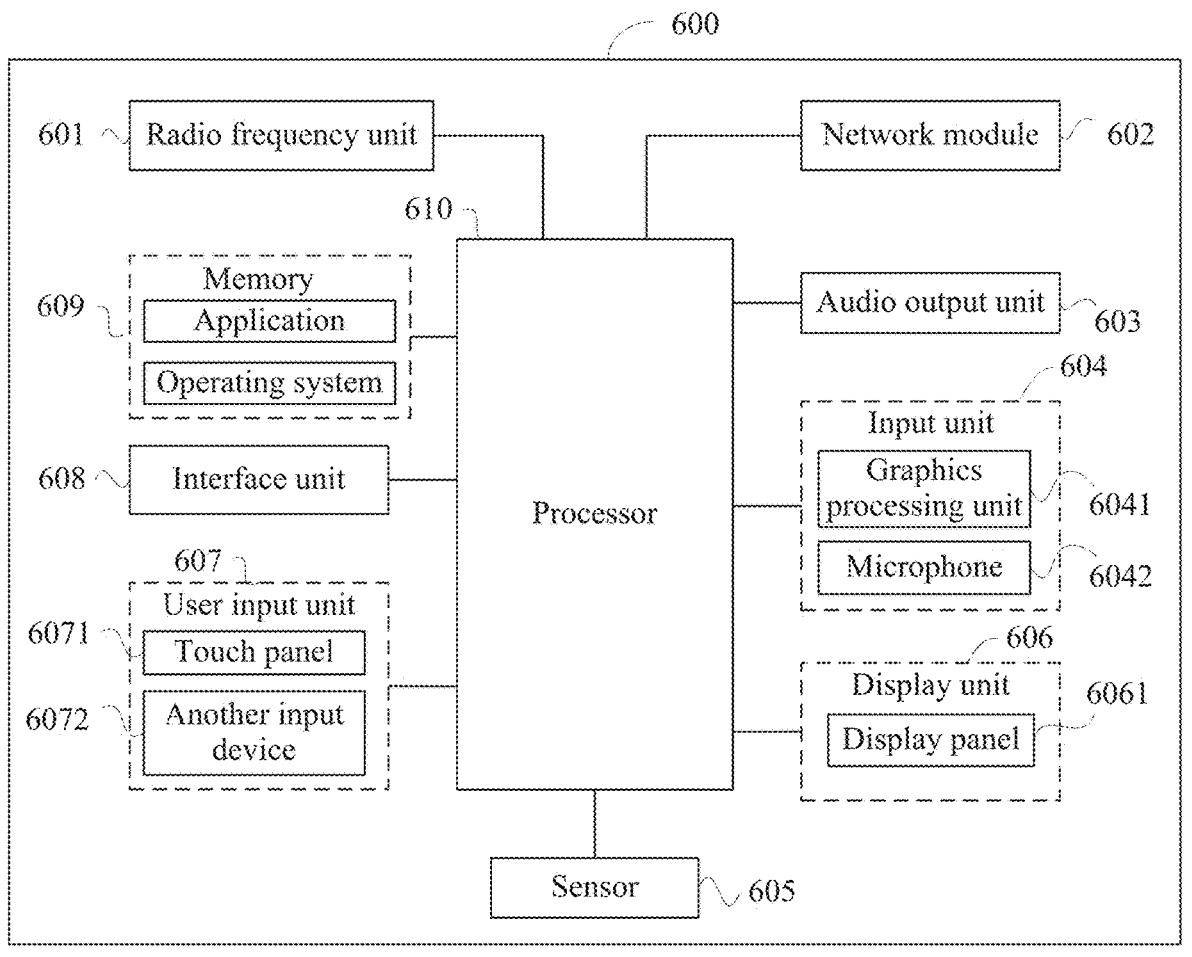
FIG. 6 is a schematic diagram of a terminal according to an embodiment of this application.

FIG. 6 is a schematic diagram of a hardware structure of a terminal according to an embodiment of this application.

The terminal 600 includes, but is not limited to, components such as a radio frequency unit 601, a network module 602, an audio output unit 603, an input unit 604, a sensor 605, a display unit 606, a user input unit 607, an interface unit 608, a memory 609, and a processor 610.

It may be understood by a person skilled in the art that the terminal 600 may further include a power supply (such as a battery) that supplies power to each component. The power supply may be logically connected to the processor 610 by using a power management system, to implement functions such as charging, discharging, and power consumption management by using the power management system. The terminal structure shown in FIG. 6 constitutes no limitation on the terminal, and the terminal may include more or fewer components than those shown in the figure, or combine some components, or have different component arrangements. Details are not described herein.

It should be understood that, in this embodiment of this application, the input unit 604 may include a Graphics Processing Unit (GPU) 6041 and a microphone 6042, and the graphics processing unit 6041 processes image data of a still picture or a video obtained by an image capture apparatus (such as a camera) in a video capture mode or an image capture mode. The display unit 606 may include a display panel 6061, and the display panel 6061 may be configured in a form of a liquid crystal display, an organic light-emitting diode, or the like. The user input unit 607 includes a touch panel 6071 and another input device 6072. The touch panel 6071 is also referred to as a touchscreen. The touch panel 6071 may include two parts: a touch detection apparatus and a touch controller. The another input device 6072 may include but is not limited to a physical keyboard, a functional button (such as a volume control button or a power on/off button), a trackball, a mouse, and a joystick. Details are not described herein.

In this embodiment of this application, the radio frequency unit 601 receives downlink data from a network side device and then sends the downlink data to the processor 610 for processing; and sends uplink data to the network side device. Usually, the radio frequency unit 601 includes but is not limited to an antenna, at least one amplifier, a transceiver, a coupler, a low noise amplifier, a duplexer, and the like.

The memory 609 may be configured to store a software program or an instruction and various pieces of data. The memory 609 may mainly include a program or instruction storage area and a data storage area. The program or instruction storage area may store an operating system, and an application program or an instruction required by at least one function (for example, a sound playing function or an image playing function). In addition, the memory 609 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 610 may include one or more processing units. In some embodiments, an application processor and a modem processor may be integrated into the processor 610. The application processor mainly processes an operating system, a user interface, an application, an instruction, or the like. The modem processor mainly processes wireless communications, for example, a baseband processor. It can be understood that, the modem processor may not be integrated into the processor 610.

The terminal provided in this embodiment of this application can implement the processes implemented in the method embodiment shown in FIG. 2, and achieve a same technical effect. To avoid repetition, details are not provided herein again.

Figure 7:
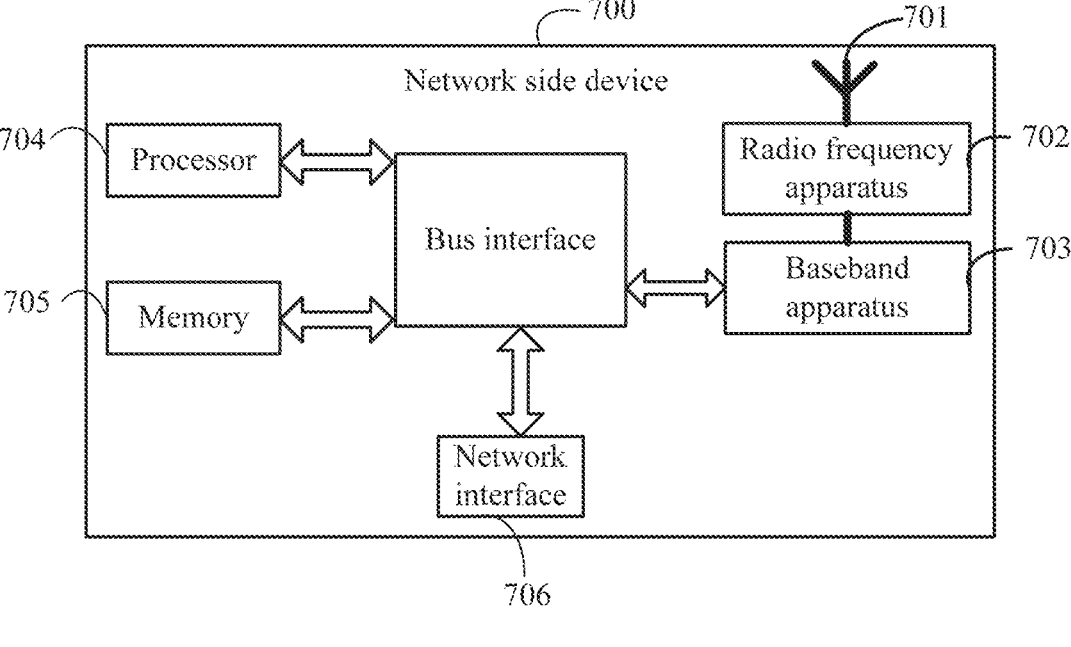
FIG. 7 is a schematic diagram of a network side device according to an embodiment of this application.

An embodiment of this application further provides a network side device. As shown in FIG. 7, the network side device 700 includes an antenna 701, a radio frequency apparatus 702, and a baseband apparatus 703. The antenna 701 is connected to the radio frequency apparatus 702. In an uplink direction, the radio frequency apparatus 702 receives information by using the antenna 701, and transmits the received information to the baseband apparatus 703 for processing. In a downlink direction, the baseband apparatus 703 processes information that needs to be sent, and sends processed information to the radio frequency apparatus 702. The radio frequency apparatus 702 processes the received information, and sends processed information by using the antenna 701.

The foregoing band processing apparatus may be located in the baseband apparatus 703, and the method performed by the network side device in the foregoing embodiment may be implemented in the baseband apparatus 703. The baseband apparatus 703 includes a processor 704 and a memory 705.

The baseband apparatus 703 may include, for example, at least one baseband board, where a plurality of chips are disposed on the baseband board. As shown in FIG. 7, one chip is, for example, the processor 704, which is connected to the memory 705, so as to invoke a program in the memory 705 to perform operations of the network device shown in the foregoing method embodiment.

The baseband apparatus 703 may further include a network interface 706, configured to exchange information with the radio frequency apparatus 702, where the interface is, for example, a common public radio interface (CPRI).

In some embodiments, the network side device further includes an instruction or a program that is stored in the memory 705 and capable of running on the processor 704. The processor 704 invokes the instruction or the program in the memory 705 to perform the method performed by the modules shown in FIG. 5, and a same technical effect is achieved. To avoid repetition, details are not described herein again.

An embodiment of this application further provides a program product. The program product is stored in a non-volatile storage medium, and the program product is executed by at least one processor, to implement the steps of the processing method in FIG. 2 or FIG. 3.

An embodiment of this application further provides a readable storage medium. The readable storage medium stores a program or an instruction. When the program or the instruction is executed by a processor, the processes in the foregoing method embodiments shown in FIG. 2 or FIG. 3 are implemented, and a same technical effect can be achieved. To avoid repetition, details are not described herein again.

The processor is a processor in the terminal in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip, where the chip includes a processor and a communication interface, the communication interface is coupled to the processor, and the processor is configured to run a program or an instruction of a network side device to implement the processes of the method embodiment in FIG. 2, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A resource configuration method, performed by a terminal, comprising:

receiving downlink control information (DCI);

determining, based on a signal resource indicator (SRI) field in the DCI, that a physical uplink shared channel (PUSCH) transmission scheduled by the DCI is associated with a plurality of sounding reference signal (SRS) resources comprised in a plurality of SRS resource sets, the plurality of SRS resource sets at least comprising a first SRS resource set and a second SRS resource set; and determining, based on a phase tracking reference signal (PTRS)-demodulation reference signal (DMRS) association field of the DCI, an association relationship between a PTRS port and a DMRS port associated with different SRS resources, wherein the PTRS-DMRS association field is 2 bits, wherein:

the PTRS-DMRS association field comprises fifth indication information and sixth indication information, wherein the fifth indication information indicates an association relationship between a port of a first PTRS resource and a scheduled DMRS port, and the scheduled DMRS port is sent on a PUSCH occasion associated with a first SRS resource; and the sixth indication information indicates an association relationship between a port of a second PTRS resource and the scheduled DMRS port, and the scheduled DMRS port is sent on a PUSCH occasion associated with a second SRS resource.

2. The resource configuration method according to claim 1, wherein the plurality of SRS resource sets are used by the terminal for a codebook transmission.

3. The resource configuration method according to claim 1, further comprising:

receiving first information, wherein the first information indicates that a length of the SRI field in the DCI is 0 bit.

4. The resource configuration method according to claim 1, wherein:

the SRI field comprises first indication information and second indication information, wherein the first indication information indicates a first specific SRS resource in the first SRS resource set associated with the PUSCH transmission, or indicates whether the PUSCH transmission is associated with the first specific SRS resource in the first SRS resource set; and the second indication information indicates a second specific SRS resource in the second SRS resource set associated with the PUSCH transmission, or indicates whether the PUSCH transmission is associated with the second specific SRS resource in the second SRS resource set.

5. The resource configuration method according to claim 1, wherein the SRI field comprises third indication information and fourth indication information, wherein the third indication information indicates the first SRS resource set or the second SRS resource set, wherein:

when the third indication information indicates the first SRS resource set, the fourth indication information indicates that the PUSCH transmission is associated with a first SRS resource or a second SRS resource in the first SRS resource set;

or when the third indication information indicates the second SRS resource set, the third indication information implicitly indicates that the PUSCH transmission is associated with a plurality of SRS resources in the second SRS resource set, and the terminal skips parsing the fourth indication information.

6. The resource configuration method according to claim 1, wherein:

the first SRS resource set comprises an SRS resource, and the second SRS resource set comprises a plurality of SRS resources; and the SRI field indicates that the PUSCH transmission is associated with the SRS resource in the first SRS resource set; or the SRI field indicates that the PUSCH transmission is associated with the plurality of SRS resources in the second SRS resource set.

7. The resource configuration method according to claim 1, wherein the first SRS resource set and the second SRS resource set are determined in ascending order based on an SRS resource set identifier.

8. The resource configuration method according to claim 1, wherein a plurality of PTRS-DMRS association fields are provided, and the SRI field in the DCI indicates that the PUSCH transmission is associated with an SRS resource, wherein a PTRS-DMRS association field in the plurality of PTRS-DMRS association fields indicates the association relationship between the PTRS port and the DMRS port, and the terminal ignores indications of other PTRS-DMRS association fields in the plurality of PTRS-DMRS association fields.

9. The resource configuration method according to claim 1, wherein a plurality of PTRS-DMRS association fields are provided, the plurality of PTRS-DMRS association fields at least comprises a first PTRS-DMRS association field and a second PTRS-DMRS association field, the SRI field in the DCI indicates that the PUSCH transmission is associated with a plurality of SRS resources, and the plurality of SRS resources at least comprises a first SRS resource and a second SRS resource, wherein:

the first PTRS-DMRS association field indicates the association relationship between the PTRS port and the DMRS port, and the PTRS port and the DMRS port are associated with the first SRS resource; and the second PTRS-DMRS association field indicates the association relationship between the PTRS port and the DMRS port, and the PTRS port and the DMRS port are associated with the second SRS resource.

10. The resource configuration method according to claim 1, wherein the PTRS-DMRS association field comprises fifteenth indication information, the fifteenth indication information indicates an association relationship between ports of a plurality of PTRS resources and the DMRS port, and the ports of the plurality of PTRS resources at least comprise a port of a first PTRS resource and a port of a second PTRS resource, wherein the port of the first PTRS resource is associated with a first SRS resource, and the port of the second PTRS resource is associated with a second SRS resource.

11. The resource configuration method according to claim 1, wherein the DCI indicates that the PUSCH transmission is associated with a plurality of SRS resources, and the PUSCH transmission comprises M PUSCH repetition occasion, wherein M is greater than or equal to 1.

12. The resource configuration method according to claim 1, wherein the PUSCH transmission is associated with the plurality of SRS resources in the following manners:

that a starting number of a first SRS resource in the plurality of SRS resources is associated with first transmission occasion of the PUSCH transmission; or that the starting number of the first SRS resource in the plurality of SRS resources is associated with a first slot in each radio frame.

13. The resource configuration method according to claim 1, wherein the first SRS resource and the second SRS resource are determined in ascending order based on an SRS resource set identifier.

14. A resource configuration method, performed by a network side device, comprising:

sending downlink control information (DCI), wherein a physical uplink shared channel (PUSCH) transmission scheduled by the DCI is associated with a plurality of sounding reference signal (SRS) resources comprised in a plurality of SRS resource sets, the plurality of SRS resource sets at least comprising a first SRS resource set and a second SRS resource set, wherein a phase tracking reference signal (PTRS)-demodulation reference signal (DMRS) association field of the DCI indicates an association relationship between a PTRS port and a DMRS port associated with different SRS resources, and wherein the PTRS-DMRS association field is 2 bits, wherein:

the PTRS-DMRS association field comprises fifth indication information and sixth indication information, wherein the fifth indication information indicates an association relationship between a port of a first PTRS resource and a scheduled DMRS port, and the scheduled DMRS port is sent on a PUSCH occasion associated with a first SRS resource; and the sixth indication information indicates an association relationship between a port of a second PTRS resource and the scheduled DMRS port, and the scheduled DMRS port is sent on a PUSCH occasion associated with a second SRS resource.

15. A network-side device, comprising:

a memory storing a computer program; and a processor coupled to the memory and configured to execute the computer program to perform the resource configuration method according to claim 14.

16. A terminal, comprising:

a memory storing a computer program; and a processor coupled to the memory and configured to execute the computer program to perform operations comprising:

receiving downlink control information (DCI);

determining, based on higher layer signaling or the DCI, that a physical uplink shared channel (PUSCH) transmission scheduled by the DCI is associated with a plurality of sounding reference signal (SRS) resources comprised in a plurality of SRS resource sets, the plurality of SRS resource sets at least comprising a first SRS resource set and a second SRS resource set; and determining, based on a phase tracking reference signal (PTRS)-demodulation reference signal (DMRS) association field of the DCI, an association relationship between a PTRS port and a DMRS port associated with different SRS resources, wherein the PTRS-DMRS association field is 2 bits, wherein:

the PTRS-DMRS association field comprises fifth indication information and sixth indication information, wherein the fifth indication information indicates an association relationship between a port of a first PTRS resource and a scheduled DMRS port, and the scheduled DMRS port is sent on a PUSCH occasion associated with a first SRS resource; and the sixth indication information indicates an association relationship between a port of a second PTRS resource and the scheduled DMRS port, and the scheduled DMRS port is sent on a PUSCH occasion associated with a second SRS resource.

* * * * *